United States Patent
Shibutani

(10) Patent No.: US 7,526,182 B2
(45) Date of Patent: Apr. 28, 2009

(54) EDITING APPARATUS AND EDITING METHOD

(75) Inventor: Manabu Shibutani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 692 days.

(21) Appl. No.: 11/231,988

(22) Filed: Sep. 22, 2005

(65) Prior Publication Data

US 2006/0078290 A1    Apr. 13, 2006

(30) Foreign Application Priority Data

Sep. 27, 2004    (JP) .............................. 2004-280482

(51) Int. Cl.
*H04N 5/93*    (2006.01)
*H04N 7/01*    (2006.01)

(52) U.S. Cl. ........................................ 386/52; 386/131

(58) Field of Classification Search .................. 386/52, 386/55, 46, 124, 125, 131
See application file for complete search history.

(56) References Cited

U.S. PATENT DOCUMENTS

2005/0163229 A1\* 7/2005 Okada et al. ........... 375/240.28

FOREIGN PATENT DOCUMENTS

| JP | 09-139937 | 5/1997 |
| JP | 10-079917 | 3/1998 |
| JP | 2003-151215 | 5/2003 |

\* cited by examiner

*Primary Examiner*—Robert Chevalier
(74) *Attorney, Agent, or Firm*—Pillsbury Winthrop Shaw Pittman, LLP

(57) ABSTRACT

An editing apparatus which edits first stream data of a first format by analyzing a header of the first stream data, creating a header of second stream data of a second format based on the analysis of the header of the first stream data, and converting the first stream data into the second stream data by use of the header of the second stream data.

12 Claims, 11 Drawing Sheets

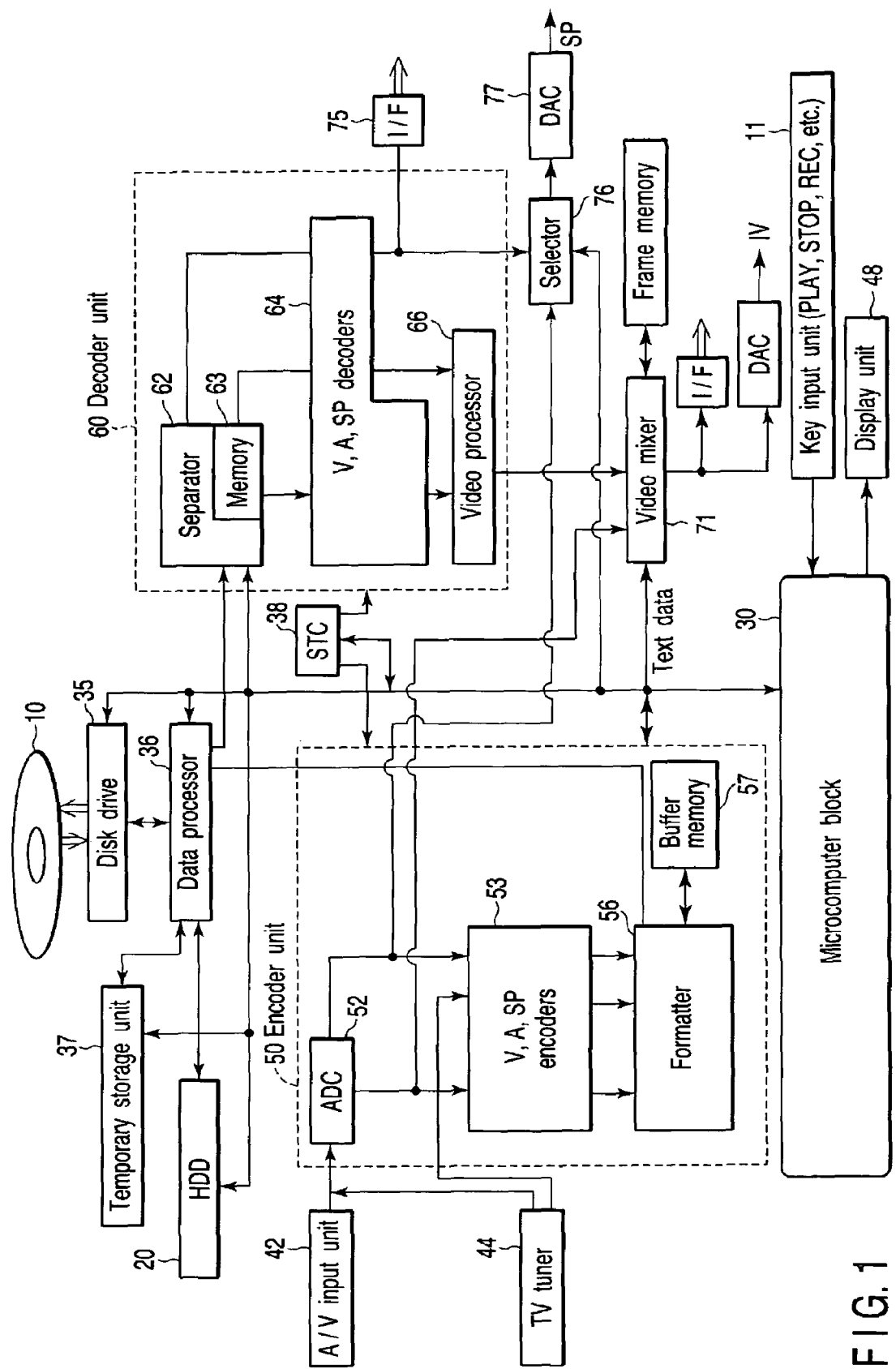
F I G. 1

PES packet header of MPEG-2 PS

| Field | Bits | Bytes | Value | Comment | |
|---|---|---|---|---|---|
| packet_start_code_prefix | 24 | 3 | 00 0001h | | ⎱ F42 |
| stream_id | 8 | 1 | | | |
| PES_packet_length | 16 | 2 | | | |
| '10' | 2 | 3 | 10b | | |
| PES_scrambling_control | 2 | | 00b | | |
| PES_priority | 1 | | 0 | no priority | |
| data_alignment_indicator | 1 | | 0 | not defined by descriptor | |
| Copyright | 1 | | 0 | not defined by descriptor | |
| original_or_copy | 1 | | 1 | original : 1, copy : 0 | F41 |
| PTS_flag | 1 | | 0 or 1 | | |
| DTS_flag | 1 | | 0 or 1 | | |
| ESCR_flag | 1 | | 0 | no ESCR field | |
| ES_rate_flag | 1 | | 0 | no ES rate field | |
| DSM_trick_mode_flag | 1 | | 0 | no trick mode field | |
| additional_copy_info_flag | 1 | | 0 | no copy info field | |
| PES_CRC_flag | 1 | | 0 | no CRC field | |
| PES_extension_flag | 1 | | 0 or 1 | | |
| PES_header_data_length | 8 | | 0 to 20 | | |
| '0011'or'0010' | 4 | 5 | | | |
| PTS [32..30] | 3 | | | | |
| marker_bit | 1 | | | | |
| PTS [29..15] | 15 | | | | |
| marker_bit | 1 | | | | |
| PTS [14..0] | 15 | | | | |
| marker_bit | 1 | | | | |
| '0001' | 4 | 5 | | | |
| DTS [32..30] | 3 | | | | |
| marker_bit | 1 | | | | |
| DTS [29..15] | 15 | | | | |
| marker_bit | 1 | | | | |
| DTS [14..0] | 15 | | | | |
| marker_bit | 1 | | | | |
| PES_private_data_flag | 1 | 1 | 0 | | |
| pack_header_field_flag | 1 | | 0 | | |
| program_packet_sequence_counter_flag | 1 | | 0 | | |
| P-STD_buffer_flag | 1 | | 1 | | |
| reserved | 3 | | 111b | | |
| PES_extension_flag_2 | 1 | | 0 | | |
| '01' | 2 | 2 | 01b | | |
| P-STD_buffer_scale | 1 | | | | |
| P-STD_buffer_size | 13 | | | | |
| stuffing_byte | - | 0 to 7 | | | |

FIG. 4

Pack header of MPEG-2 PS

| Field | Bits | Bytes | Value | Comment |
|---|---|---|---|---|
| pack_start_code | 32 | 4 | 0000 01BAh | |
| '01' | 2 | 6 | | 01b |
| SCR_base [32..30] | 3 | | | |
| marker_bit | 1 | | | 1 |
| SCR_base [29..15] | 15 | | | |
| marker_bit | 1 | | | 1 |
| SCR_base [14..0] | 15 | | | |
| marker_bit | 1 | | | 1 |
| SCR_extension | 9 | | | |
| marker_bit | 1 | | | 1 |
| program_mux_rate | 22 | 3 | | |
| marker_bit | 1 | | | 1 |
| marker_bit | 1 | | | 1 |
| reserved | 5 | 1 | F8h | 11111b |
| pack_stuffing_length | 3 | | | no stuffing length=000b |

FIG. 7

Packet header of MPEG-1 SS

| Field | Bits | Bytes | Value | Comment |
|---|---|---|---|---|
| packet_start_code_prefix | 24 | 3 | 00 0001h | |
| stream_id | 8 | 1 | | |
| packet_length | 16 | 2 | | |
| stuffing_byte | 8*n | n | 1111 1111b | |
| '01' | 2 | 2 | 01b | |
| STD_buffer_scale | 1 | | | |
| STD_buffer_size | 13 | | | |
| '0010'or'0011' | 4 | 5 | | |
| PTS [32..30] | 3 | | | |
| marker_bit | 1 | | | |
| PTS [32..30] | 15 | | | |
| marker_bit | 1 | | | |
| PTS [32..30] | 15 | | | |
| marker_bit | 1 | | | |
| '0001' | 4 | 5 | | |
| DTS [32..30] | 3 | | | |
| marker_bit | 1 | | | |
| DTS [32..30] | 15 | | | |
| marker_bit | 1 | | | |
| DTS [32..30] | 15 | | | |
| marker_bit | 1 | | | |
| '0000 1111' | 8 | 1 | | |

- F21: packet_start_code_prefix, stream_id
- F22: packet_length
- F28: F21 + F22
- F23: stuffing_byte
- F24: '01', STD_buffer_scale, STD_buffer_size
- F25: PTS fields
- F26: DTS fields
- F27: '0000 1111'

FIG. 9

Pack header of MPEG-1 SS

| Field | Bits | Bytes | Value | Comment | |
|---|---|---|---|---|---|
| pack_start_code | 32 | 4 | 0000 01BAh | | } F11 |
| '0010' | 4 | | | 0010b | |
| SCR [32..30] | 3 | | | | |
| marker_bit | 1 | | | 1 | |
| SCR [29..15] | 15 | 5 | | | } F12 |
| marker_bit | 1 | | | 1 | |
| SCR [14..0] | 15 | | | | |
| marker_bit | 1 | | | 1 | |
| marker_bit | 1 | | | 1 | |
| mux_rate | 22 | 3 | | | } F13 |
| marker_bit | 1 | | | 1 | |

FIG. 12

Padding packet

| Field | Bits | Bytes | Value | Comment | |
|---|---|---|---|---|---|
| packet_start_code_prefix | 24 | 3 | 00 0001h | | ⎫ F31 |
| stream_id | 8 | 1 | 1011 1111b | private_stream_2 | ⎭ |
| packet_length | 16 | 2 | | | ⎬ F32 |
| padding_byte | 8*n | n | 1111 1111b | | |

EDITING APPARATUS AND EDITING METHOD

CROSS-REFERENCE TO RELATED APPLICATIONS

This application is based upon and claims the benefit of priority from prior Japanese Patent Application No. 2004-280482, filed Sep. 27, 2004, the entire contents of which are incorporated herein by reference.

BACKGROUND OF THE INVENTION

1. Field of the Invention

The present invention relates to an editing apparatus and an editing method of video data, and more specifically, to an editing apparatus and an editing method for editing system streams and program streams of an MPEG standard.

2. Description of the Related Art

In recent years, MPEG (Moving Picture Experts Group) as an audio/video recording digital format has been used widely. The MPEG standard, along the expansion of its applications and the release of new compression technologies, has had some versions, and those used mainly at present are MPEG-1, MPEG-2 and MPEG-4. There are many hardware items for encoding audio/video data into these MPEG data.

In the MPEG standard, besides specifications of video compressed data (VideoElementaryStream, hereinafter referred to as VideoES), and audio compressed data (AudioElementaryStream, hereinafter referred to as AudioES), the multiplexing methods for playing these compressed video and audio data in synchronization are specified. Specifications corresponds to these are MPEG1SystemStream (hereinafter, MPEG-1 SS) in MPEG-1, and MPEG2ProgramStream (hereinafter, MPEG-2 PS) in MPEG-2. These two specifications are structured by similar syntax, but there is no complete compatibility therebetween.

Meanwhile, MPEG-2 encoders released recently have functions to encode VideoES and AudioES as MPEG-1 stream data, however, with regard to the multiplexing methods, many of them do not cope with MPEG-1 SS, but cope with only MPEG-2 PS. On the other hand, among software programs capable of reproducing MPEG data on personal computers, there are many that cope with only MPEG-1 format, therefore they cannot play MPEG-2 PS data encoded by such MPEG-2 encoders as the above, which has been a problem in the prior art.

In a conventional information recording device that converts formats of information, when recording a video stream whose format may be converted, conversion information necessary at format conversion is inserted into recording information in advance, thereby the calculation amount at conversion is reduced and conversion in a realistic time period is enabled (for example, refer to Japanese Patent KOKAI Publication No. 2003-151215, paragraphs [0003] and [0005]).

However, the above document handles with conversion of data streams based on a DVD-VR (Video Recording) standard into a DVD-V (Video) standard that has no compatibility therewith, and does not handle with conversion in the MPEG standard.

As described above, there has been the problem that MPEG-2 PS data encoded by the conventional MPEG-2 encoders cannot be played back by software programs that operate on personal computers and cope with only MPEG-1 format.

BRIEF SUMMARY OF THE INVENTION

An object of the present invention is to provide an editing apparatus and an editing method that analyze MPEG-2 PS data items output from MPEG-2 encoders, and reconstruct data items, thereby converting the MPEG-2 PS data into MPEG-1 SS data.

According to an embodiment of the present invention, an editing apparatus which edits first stream data of a first format and comprises means for analyzing a header of the first stream data; means for creating a header of second stream data of a second format based on an analysis result by the analyzing means; and means for converting the first stream data into the second stream data by use of the header of the second stream data created by the creating means.

According to another embodiment of the present invention, a method for editing first stream data of a first format comprises a step of analyzing a header of the first stream data; a step of creating a header of second stream data of a second format based on an analysis result by the analyzing step; and a step of converting the first stream data into the second stream data by use of the header of the second stream data created by the creating step.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 1 is a block diagram showing the structure of a recording/reproducing apparatus as an embodiment of an editing apparatus according to the present invention;

FIG. 4 shows the structure of a PES packet header of MPEG-2 PS;

FIG. 7 shows the structure of a pack header of MPEG-2 PS;

FIG. 9 is a flow chart for explaining the flow of creation of a packet header of MPEG-1 SS;

FIG. 12 shows the structure of the pack header of MPEG-1 SS;

DETAILED DESCRIPTION OF THE INVENTION

Figure 2:
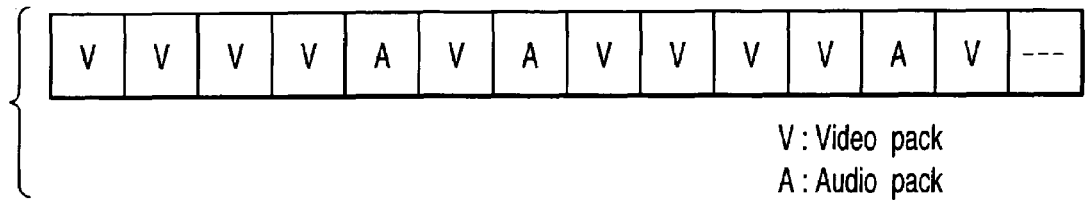
FIG. 2 shows the structure of audio/video data.

An embodiment of an editing apparatus according to the present invention will now be described with reference to the accompanying drawings.

FIG. 1 is a block diagram showing the structure of a recording/reproducing apparatus according to an embodiment of the present invention. The recording/reproducing apparatus has its main structural components of a hard disk drive (HDD) 20, a disk drive 35 which rotates and drives an optical disk 10 as an information storage medium such as a DVD (Digital Versatile Disk) or the like in which video files are structured, and reads and writes information from/to the optical disk 10, an encoder unit 50 which configures a recording unit, a decoder unit 60 which configures a reproducing unit, and a microcomputer block 30 which controls the operations of the device main structural components.

The encoder unit 50 has an analog digital converter (ADC) 52, encoders 53 including a video (V) encoder, an audio (A) encoder and a sub picture (SP) encoder, a formatter 56 which makes outputs of the respective encoders a specified format, and a buffer memory 57.

To the analog digital converter 52, external analog video signals and external analog audio signals from an A/V input unit 42, or analog TV signals and analog audio signals from a television (TV) tuner 44 are input.

A data processor 36, under the control of the microcomputer block 30, supplies DVD record data output from the encoder unit 50 to the disk drive 35, and takes in DVD reproducing signals reproduced from the optical disk 10 from the disk drive 35, and rewrites control information recorded in the optical disk 10, and deletes data recorded in the optical disk 10.

The microcomputer block 30 includes a micro processing unit (MPU), a ROM which stores a control program and the like, and a RAM which provides work areas necessary to execute programs.

The micro processing unit of the microcomputer block 30, in conformity with a control program of the present embodiment stored in the ROM thereof, uses the RAM as its work area, and executes editing, fault place detection, non recorded area detection, recorded information recording position setting, UDF recording, A/V address setting and so forth.

The decoder unit 60 has a separator 62 which separates and takes out audio packs, video packs, and the like from video information having a pack structure, a memory 63 used at execution of pack separation and other signal processes, decoders 64 including a video (V) decoder which decodes main picture data separated by the separator 62, a sub picture (SP) decoder which decodes sub picture data separated by the separator 62, and an audio (A) decoder which decodes audio data separated by the separator 62, and a video processor 66 which appropriately composes sub picture data obtained from the sub picture decoder and main picture data obtained from the video decoder, and outputs menus, subtitles and other sub pictures to be overlapped on main pictures.

In the case of digital output, the output of the audio decoder is output via an interface (I/F) 75 to the outside, and in the case of analog output, the output is analog converted via a selector 76 by a digital analog converter (DAC) 77 and output to the outside. The selector 76, according to a select signal from the microcomputer block 30, selectively outputs either signals which are input from the TV tuner 44 or the A/V input unit 42 via the analog digital converter 52, or signals which are input from the decoders 64. Analog audio signals are supplied to an external component (2-channel to 6-channel multi channel stereo device) not illustrated therein.

A key input unit 11 has buttons of play, stop, record, skip, fast forward, reverse, slow, and enter key and the like, and by pressing down these buttons, a user may operate the present recording/reproducing apparatus, record data to the hard disk drive 20 or the rewritable optical disk 10, and reproduce and edit recorded video data.

FIG. 2 shows the structure of audio/video data (stream) that the present recording/reproducing apparatus handles. The structure of audio/video data is the same in both MPEG-2 PS format and MPEG-1 SS format, and several pieces of unit called pack configure the data. There are kinds of pack, and a pack in which video is recorded is a video pack, and one in which audio is recorded is an audio pack.

Figure 3:
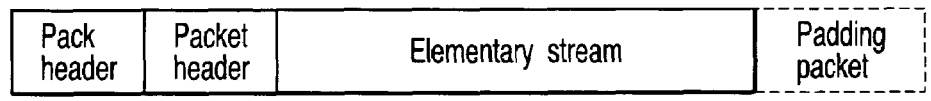
FIG. 3 shows the structure of a pack.

FIG. 3 shows the structure of a pack. A pack is structured by a pack header and one or more packets. There are kinds of packet, and in a packet (called PES packet in MPEG-2) in which video and audio are recorded, following the packet header, an elementary stream as video and audio compressed data is recorded. A padding packet is a packet for adjusting the length of a pack.

Hereinafter, a method for converting MPEG-2 PS data into MPEG-1 SS data by the present embodiment will be explained. Herein, explanations are made with an example where in the recording/reproducing apparatus shown in FIG. 1, audio/video data of the MPEG-2 PS format recorded in the hard disk drive 20 is converted into audio/video data of the MPEG-1 SS format and recorded in the optical disk 10. The MPEG-2 PS data as the conversion source is assumed to have a data structure where VideoES of MPEG-1 format and AudioES of MPEG-1 format are multiplexed. It is assumed that the MPEG-2 PS data is structured by video packs and audio packs, and the size of the packs is all 2048 bytes. Each pack is assumed to include a PES packet, or a PES packet and a padding packet. The packet header of the PES packet is assumed to be of a data row of the representative PES packet header of MPEG-2 PS as shown in FIG. 4. And it is assumed that in the PES packet of the video pack and the audio pack at the start of audio/video data, the value of PES_extension_flag shown in FIG. 4 is always 1.

Figures 14, 15:
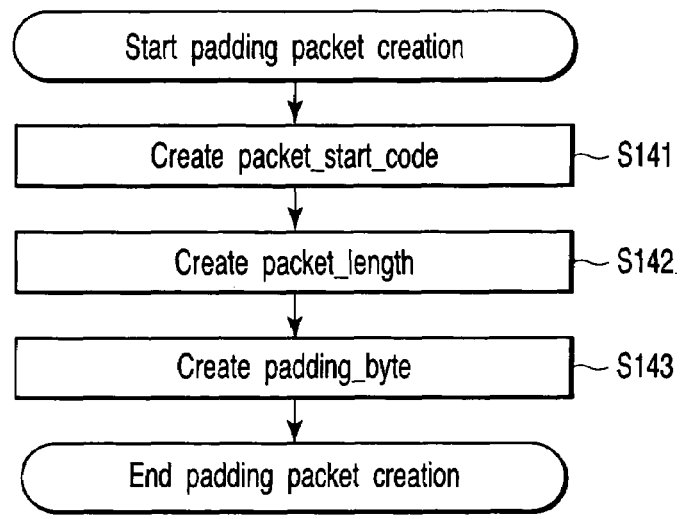
FIG. 14 is a flow chart for explaining the flow of creation of a padding packet of MPEG-1 SS.
FIG. 15 is a figure showing the structure of the padding packet of MPEG-1 SS.

FIG. 4 shows the structure of a PES packet header of MPEG-2 PS, FIG. 7 shows that of a pack header of MPEG-2 PS, FIG. 9 shows that of a packet header of MPEG-1 SS, FIG. 12 shows that of a pack header of MPEG-1 SS, and FIG. 15 shows that of a padding packet.

Figure 5:
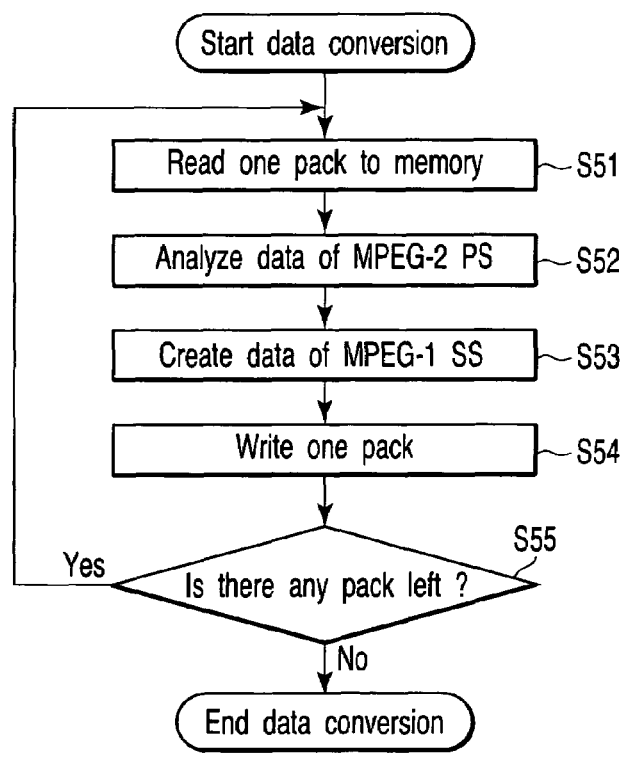
FIG. 5 is a flow chart for explaining the flow of data conversion.

FIG. 5 is a flow chart showing the outline of the entire flow of conversion from MPEG-2 PS data into MPEG-1 SS data.

When audio/video data (title) multiplexed by the MPEG-2 PS format recorded in the hard disk drive 20 is selected by a user, the microcomputer block 30 reads the audio/video data recorded in the hard disk drive 20 via the data processor 36 to the work area RAM in unit of pack (step S51).

The main CPU of the data processor 36 analyzes the information in the pack (step S52), and creates a new pack multiplexed by the MPEG-1 SS format in the work area RAM (step S53).

The created pack is written via the data processor 36 and the disk drive 35 into the optical disk 10 (step S54).

The above operations are performed to all the packs of the audio/video data, thereby, it is possible to convert the data multiplexed by the MPEG-2 PS format into the data multiplexed by the MPEG-1 SS format and write the data into the optical disk 10.

Figure 6:
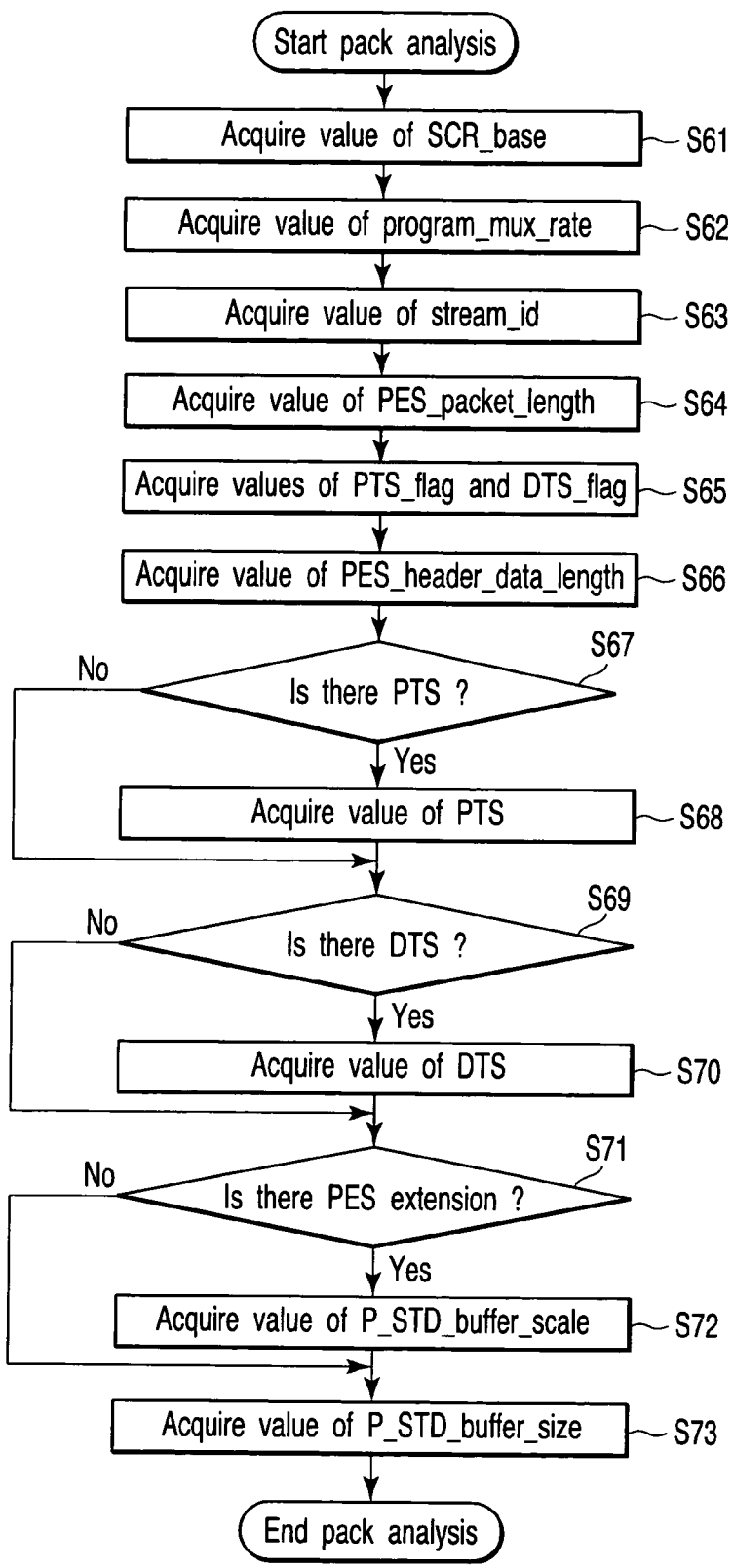
FIG. 6 is a flow chart for explaining the flow of analysis of a pack of MPEG-2 PS.

The flow chart in FIG. 6 shows the flow to analyze the pack of MPEG-2 PS read to the work RAM (step S52 in FIG. 5).

From the pack header of MPEG-2 PS having the structure shown in FIG. 7, the value of 3-bit SCR_base and the value of 22-bit program_mux_rate are acquired (steps S61 and S62).

Then, the PES packet header of MPEG-2 PS having the structure shown in FIG. 4 is analyzed. From the PES packet header, the values of stream_id, PES_packet_length, PTS_flag, DTS_flag, and PES_header_data_length are acquired (steps S63, S64, S65, and S66).

If it is found that PTS exists from the value of PTS_flag, the value of PTS is acquired (steps S67 and S68).

If it is found that DTS exists from the value of DTS_flag, the value of DTS is acquired (steps S69 and S70).

If it is found that a PES extension field exists from the value of PES_extension_flag, the values of P_STD_buffer_scale and P_STD_buffer_size are acquired (steps S71, S72 and S73). Then, the pack analysis is completed.

Figure 8:
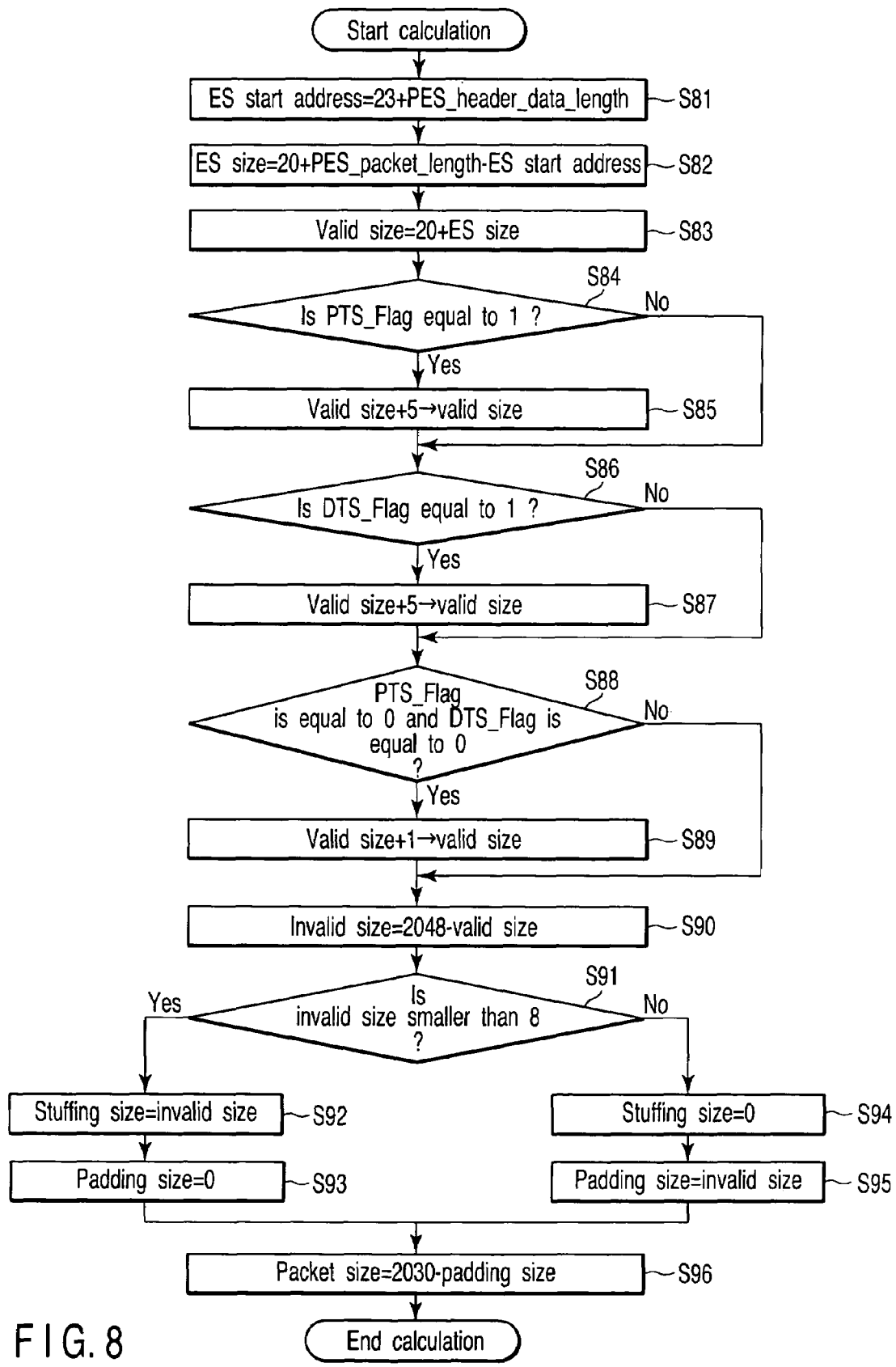
FIG. 8 is a flow chart for explaining the flow of calculations of the value necessary for creating data of MPEG-1 SS.

FIG. 8 is a flow chart for calculating the values necessary to configure a pack of MPEG-1 SS format, by use of the values acquired in the analysis on a pack of MPEG-2 PS format.

An ES start address is the first address at which the elementary stream appears in a pack of MPEG-2 PS, by the position from the start of the pack. The ES start address is obtained by adding the pack header (14 bytes) of MPEG-2 PS shown in FIG. 7, a field F41 (9 bytes) in the packet header of MPEG-2 shown in FIG. 4, and PES_header_data_length (step S81).

ES size is the size of the elementary stream included in a pack of MPEG-2 PS. The ES size is obtained by subtracting the ES start address from the sum of the pack header (14 bytes) of MPEG-2 PS shown in FIG. 7, the field F42 (6 bytes) in the packet header of MPEG-2 shown in FIG. 4, and PES_packet_length (step S82)

Valid size is the size of the other field than a padding area and a stuffing area in a pack of MPEG-1 SS to be created from now. The valid size is obtained by adding the pack header (14 bytes) and a field F28 (6 bytes) in FIG. 9 and the ES size (step S83).

If the value of PTS_flag acquired in step S65 in FIG. 6 is 1, it is necessary to insert PTS to the packet of MPEG-1 SS, therefore, 5 is added to the valid size (steps S84 and S85).

If the value of DTS_flag acquired in step S65 in FIG. 6 is 1, it is necessary to insert DTS to the packet of MPEG-1 SS, therefore, 5 is added to the valid size (steps S86 and S87).

If both the PTS_flag and DTS_flag are 0, it is necessary to insert a field F27 in FIG. 9 into the packet of MPEG-1 SS, therefore 1 is added to the valid size (steps S88 and S89). Through the above processes, the valid size is obtained.

The value obtained by subtracting the valid size from the pack size 2048 bytes becomes invalid size (step S90). If the invalid size is smaller than 8 bytes, the stuffing area is inserted into the pack of MPEG-1 SS, thereby the entire pack size is made into 2048 bytes. Accordingly, the stuffing size is set to the invalid size, and the padding size is set to 0 (steps S91, S92 and S93).

If the invalid size is 8 bytes or more, a padding packet is inserted into the pack of MPEG-1 SS, thereby the entire pack size is made into 2048 bytes. Accordingly, the stuffing size is set to 0, and the padding size is set to the invalid size (steps S94 and S95).

Packet length is the value that becomes packet_length of the packet of MPEG-1 SS. This value is obtained by subtracting the padding size from the value (2300 bytes) obtained by subtracting from the pack length 2048 the pack header (12 bytes) of MPEG-1 SS shown in FIG. 12 and a field F28 (6 bytes) of the packet header of MPEG-1 SS shown in FIG. 9. Through the above processes, the calculations necessary to configure the pack of MPEG-1 SS is completed.

Figure 10:
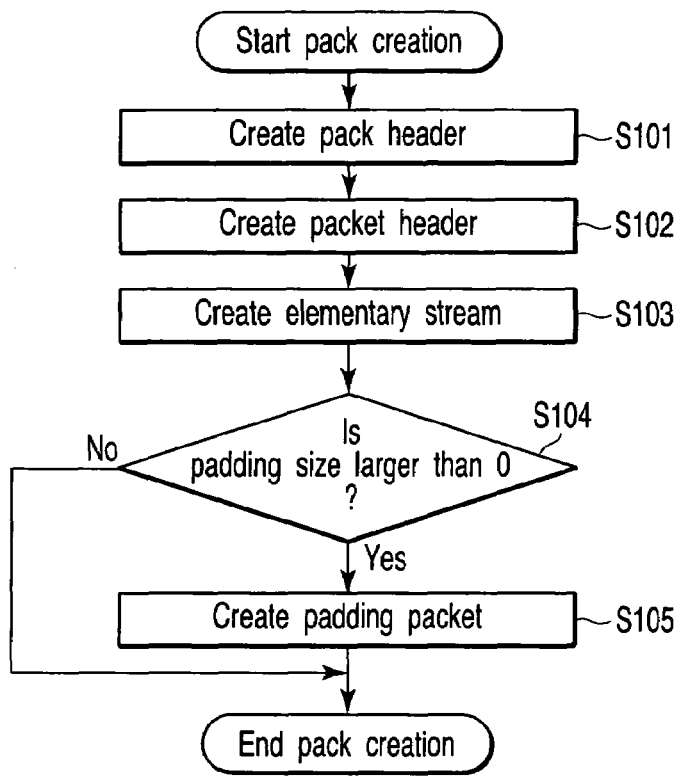
FIG. 10 is a flow chart for explaining the flow of creation of a pack of MPEG-1 SS.

FIG. 10 is a flow chart showing the flow of pack creation of MPEG-1 SS format (step S53 in FIG. 5).

Following the pack header creation (step S101), the packet header is created (step S102), and the elementary stream is created (step S103). If the padding size obtained in step S93 or S95 in FIG. 8 is larger than 0, a padding packet is created (step S105). The data created herein are to be arranged sequentially from the start in the area of 2048 bytes arranged in the work area RAM for a new pack creation.

Figure 11:
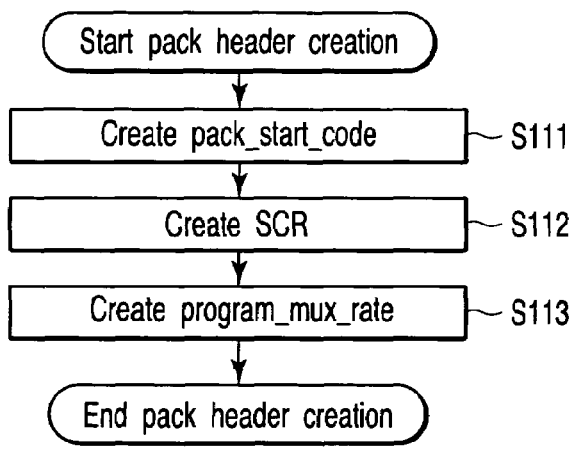
FIG. 11 is a flow chart for explaining the flow of creation of a pack header of MPEG-1 SS.

FIG. 11 is a flow chart showing the flow of the pack header creation (step S101 in FIG. 10).

First, pack_start_code shown in a field F11 in the pack header of MPEG-1 SS shown in FIG. 12 is created (step S111).

With the value of SCR_base acquired in step S61 in FIG. 6 as SCR, a field SCR shown in a field F12 in the pack header of MPEG-1 SS shown in FIG. 12 is created (step S112).

By use of the value of program_mux_rate acquired in step S62 in FIG. 6, the field shown in a field F13 in the pack header of MPEG-1 SS shown in FIG. 12 is created (step S63).

Figure 13:
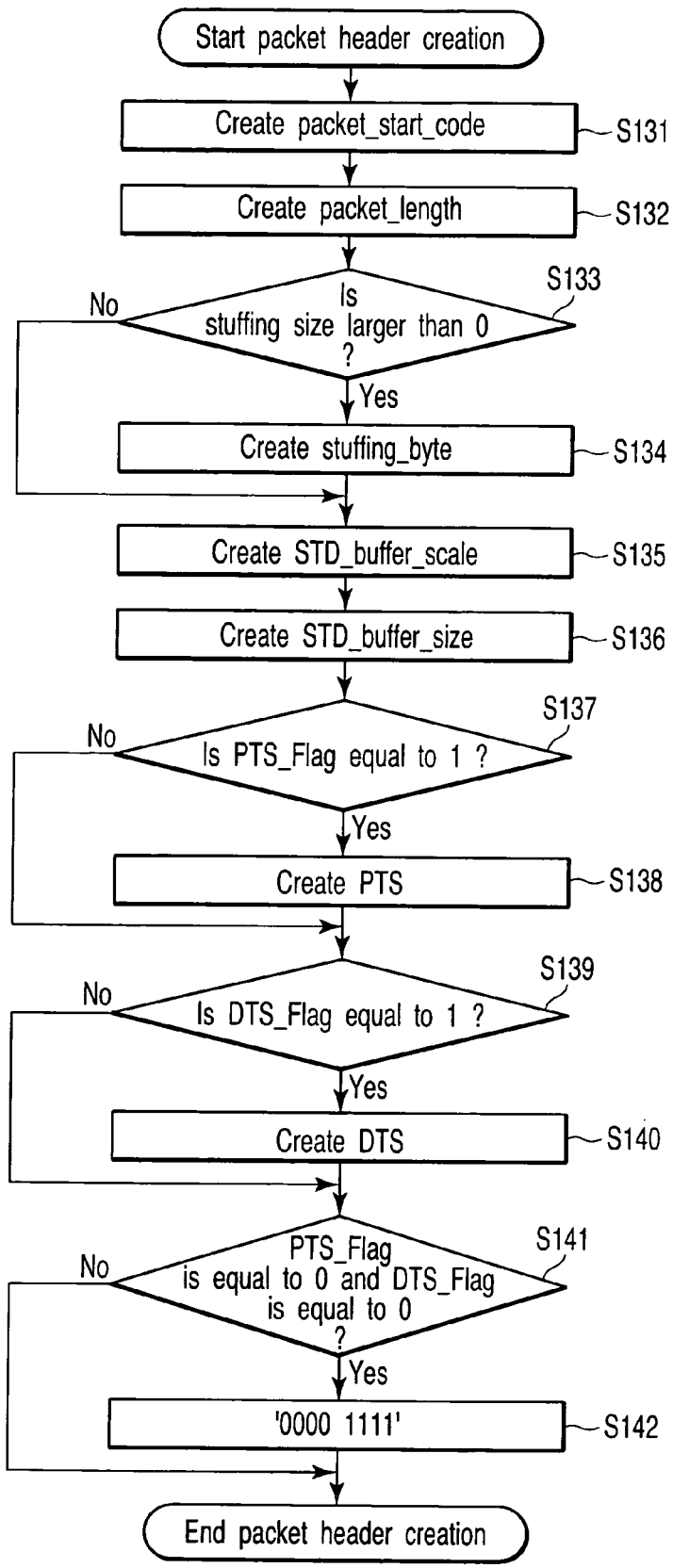
FIG. 13 is a flow chart for explaining the flow of creation of the packet header of MPEG-1 SS.

FIG. 13 is a flow chart showing the packet header creation of MPEG-1 SS (step S102 in FIG. 10).

By use of the value of stream_id acquired in step S63 in FIG. 6, the field shown in a field F21 in the packet header of MPEG-1 SS shown in FIG. 9 is created (step S131).

By use of the packet size acquired in step S96 in FIG. 8, packet_length of a field F22 in the packet header of MPEG-1 SS shown in FIG. 9 is created (step S132).

If the staffing size calculated in step S92 or S94 in FIG. 8 is larger than 0, stuffing_byte of a field F23 in the packet header of MPEG-1 SS shown in FIG. 9 is created for the number of the staffing size (steps S133 and S134).

By use of P-STD_buffer_scale and P-STD_buffer_size acquired in steps S72 and S73 in FIG. 6, a field F24 in the packet header of MPEG-1 SS shown in FIG. 9 is created. If P-STD_buffer_scale or P-STD_buffer_size is not included in the original packet of MPEG-2 PS, the value of the same kind of pack acquired previously is used (steps S135 and S136).

If the value of PTS_flag acquired in step S65 in FIG. 6 is 1, then by use of PTS acquired in step S68 in FIG. 6, a field F25 in the packet header of MPEG-1 SS shown in FIG. 9 is created (steps S137 and S138).

If the value of DTS_flag acquired in step S65 in FIG. 6 is 1, then by use of DTS acquired in step S130 in FIG. 6, a field F26 in the packet header of MPEG-1 SS shown in FIG. 9 is created (steps S139 and S140).

If both the values of PTS_flag and DTS_flag are 0, a field F27 in the packet header of MPEG-1 SS shown in FIG. 9 is created (steps S141 and S142).

Thereafter, the elementary stream area is created (step S103 in FIG. 10).

By use of the ES start address and the ES size obtained in steps S81 and S82 in FIG. 8, the elementary stream in the original MPEG-2 PS pack is copied to the elementary stream area of the pack of MPEG-1 SS.

If the padding size obtained in step S93 or S95 in FIG. 8 is larger than 0, a padding packet is created (steps S104 and S105 in FIG. 10).

FIG. 14 is a flow chart showing the flow of padding packet creation (step S105 in FIG. 10).

Then, packet_start_code shown in a field F31 in the padding packet shown in FIG. 15 is created (step S141).

The packet_length shown in a field F32 in the padding packet shown in FIG. 15 is created by the value obtained by subtracting the padding packet header length (6 bytes) from the padding size (step S142).

Finally, 0xff data is created for the size indicated by the value of packet_length (step S143).

As explained heretofore, according to the present embodiment, when data multiplexed by MPEG-2 PS is to be converted into data multiplexed by MPEG-1 SS, the pack header and the packet header of original data are analyzed, and the pack header and the packet header of multiplexed data of MPEG-1 SS format are configured, and the pack header and the packet header of MPEG-1 SS are added before the elementary stream of MPEG-2 PS, and the padding packet is added later if necessary, therefore, it is possible to perform data conversion without changing the pack size before and after the conversion. Therefore, it is possible to reproduce multiplexed data encoded by MPEG-2 encoders by software that operates on a personal computer and corresponds only to MPEG-1 format.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An editing apparatus which edits first stream data of a first format, comprising:
    means for analyzing a header of the first stream data;
    means for creating a header of second stream data of a second format based on an analysis result by the analyzing means; and
    means for converting the first stream data into the second stream data by use of the header of the second stream data created by the creating means.

2. The editing apparatus according to claim 1, wherein the converting means converts the first stream data into the second stream data of the same size.

3. The editing apparatus according to claim 2, wherein the converting means obtains the second stream data based on the header of the second stream data created by the creating means, an elementary stream of the first stream data, and a padding packet.

4. The editing apparatus according to claim 1, wherein the converting means converts the first stream data into the second stream data in unit of pack.

5. The editing apparatus according to claim 1, wherein
    the analyzing means analyzes a pack header and a packet header of the first stream data; and
    the creating means creates a pack header and a packet header of the second stream data based on the pack header and the packet header analyzed by the analyzing means.

6. The editing apparatus according to claim 1, wherein the first stream data comprises MPEG-2 program stream data and the second stream data comprises MPEG-1 system stream data.

7. A method for editing first stream data of a first format, comprising:
    analyzing a header of the first stream data;
    creating a header of second stream data of a second format based on analysis result by the analyzing step; and
    converting the first stream data into the second stream data by use of the header of the second stream data created by the creating step.

8. The editing method according to claim 7, wherein the converting step converts the first stream data into the second stream data of the same size.

9. The editing method according to claim 8, wherein the converting step obtains the second stream data based on the header of the second stream data created by the creating step, an elementary stream of the first stream data, and a padding packet.

10. The editing method according to claim 7, wherein the converting step converts the first stream data into the second stream data in unit of pack.

11. The editing method according to claim 7, wherein
    the analyzing step analyzes a pack header and a packet header of the first stream data; and
    the creating step creates a pack header and a packet header of the second stream data based on the pack header and the packet header analyzed by the analyzing step.

12. The editing method according to claim 7, wherein the first stream data comprises MPEG-2 program stream data and the second stream data comprises MPEG-1 system stream data.

* * * * *